United States Patent Office 3,046,302
Patented July 24, 1962

3,046,302
METHYLCARBAMATES
Phyllis D. Oja, Walnut Creek, Calif., assignor to The Dow Chemical Company, Midland, Mich., a corporation of Delaware
No Drawing. Filed Aug. 28, 1959, Ser. No. 836,593
2 Claims. (Cl. 260—482)

This invention is concerned with carbamates and more particularly with phenylpropynyl methylcarbamates having the structure

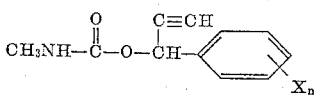

In this and succeeding formulas, X represents a chloro or methoxy radical and $n$ is from 0 to 1, inclusive. These new compounds are colorless or light colored crystalline solids which are soluble in polar organic solvents such as methanol, ethanol, isopropanol nad acetone. These compounds are valuable as active toxic constituents of herbicidal and parasiticidal compositions.

The new compounds may be prepared by intimately mixing together methyl isocyanate and an acetylenic alcohol having the formula

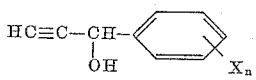

The reactants may be brought together in an inert organic solvent such as benzene, toluene, methylene chloride, carbon tetrachloride and the like. The amounts of the reactants employed are not critical, some of the desired products being obtained when any proportion of the reactants is employed. Good results are obtained when substantially equimolar proportions of the acetylenic alcohol and methyl isocyanate are used. It is usually desirable to employ a small amount of a tertiary amine as catalyst to hasten the carbamylation reaction. Particularly suitable are tertiary alkyl amines such as triethylamine and trimethylamine. The reaction takes place smoothly at a temperature in the range of from 15° C. to 50° C. During the reaction the desired product usually separates from the reaction medium as a crystalline solid. When the product does not separate during the course of the reaction, precipitation of the product may be effected by cooling and/or diluting the reaction mixture with a non-polar solvent such as hexane. Following the reaction, the product may be separated by filtration and thereafter purified by washing with an inert solvent and/or by recrystallizing from a polar solvent such as acetone.

In a preferred method for carrying out the reaction, the appropriate acetylenic alcohol, methyl isocyanate, and triethylamine catalyst are combined in an inert solvent with stirring and at a temperature of from about 15° to 50° C. and allowed to react from 1 to 24 hours. Following the reaction, the product is separated and purified as previously described.

The following examples illustrate the invention but are not to be construed as limiting.

*Example 1.—1-(2-Chlorophenyl)-2-Propynyl Methylcarbamate*

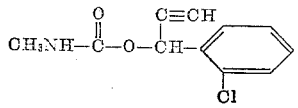

A solution of 16.7 grams (0.10 mole) of 1-(2-chlorophenyl)-2-propynol in 125 milliliters of methylene chloride was intimately mixed with a solution of 5.7 grams (0.10 mole) of methyl isocyanate in 25 milliliters of methylene chloride while the temperature was 26° C. Two milliliters of dry triethylamine was then added to the mixture with stirring and the resulting homogeneous solution heated to 32° C. The reaction mixture was then allowed to stand at room temperature for 17 hours. During this period a reaction took place with the formation of 1-(2-chlorophenyl)-2-propynyl methylcarbamate product which partly precipitated in the reaction mixture. The mixture was concentrated to 75 milliliters by vaporizing a portion of the methylene chloride solvent. 75 milliliters of normal-hexane was added to the resulting concentrate to precipitate the desired product as glistening white needles, having a melting point of 80.5°– 83.5° C. The yield of the product was 20.1 grams or 88 percent of theoretical.

*Example 2.—1-Phenyl-2-Propynyl Methylcarbamate*

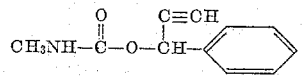

13.2 grams (0.10 mole) of 1-phenyl-2-propynol and 6.0 grams (0.105 mole) of methyl isocyanate were mixed together in 75 milliliters of benzene at 23° C. One milliliter of triethylamine was added to the reaction mixture and the resulting mixture allowed to stand overnight to obtain the desired 1-phenyl-2-propynyl methylcarbamate product as a crystalline solid melting in the temperature range of from 51° to 57° C.

*Example 3.—1-(4-Methoxyphenyl)-2-Propynyl Methylcarbamate*

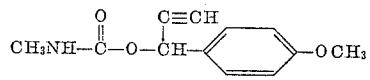

24.5 grams (0.15 mole) of 1-(4-methoxyphenyl)-2-propynol and 8.6 grams (0.15 mole) of methyl isocyanate were mixed together in 60 milliliters of methylene chloride at 23° C. and 1 milliliter of triethylamine added thereto. The reaction mixture was allowed to stand for one hour whereupon the desired 1-(4-methoxyphenyl)-2-propynyl methylcarbamate precipitated in the reaction mixture. The product was recovered by filtration and recrystallized from acetone to obtain a purified product melting from 78.5° to 85.0° C. The yield of the product was 26 grams or 78 percent of theoretical.

*Example 4.—1-(4-Chlorophenyl)-2-Propynyl Methylcarbamate*

In a reaction carried out in a manner similar to that described in Example 1, 16.7 grams (0.10 mole) of 1-(4-chlorophenyl)-2-propynol and 5.7 grams (0.10 mole) of methyl isocyanate were mixed together in methylene chloride. Two milliliters of triethylamine was added thereto and the resulting mixture was allowed to stand for one hour to produce the desired 1-(4-chlorophenyl)-2-propynyl methylcarbamate product melting from 109.5° to 114.0° C.

In similar preparations the following phenylpropynyl methylcarbamates are prepared:
1-(3-chlorophenyl)-2-propynyl methylcarbamate having a molecular weight of 227 by the reaction of 1-(3-chlorophenyl)-2-propynol and methyl isocyanate.
1-(2-methoxyphenyl)-2-propynyl methylcarbamate having a molecular weight of 223 from the reaction of 1-(2-methoxyphenyl)-2-propynol and methyl isocyanate.
1-(3-chlorophenyl)-2-propynyl methylcarbamate having a molecular weight of 223 from the reaction of 1-(3-methoxyphenyl)-2-propynol and methyl isocyanate.

The products of the preceding example are effective as herbicides and are adapted to be employed for the control of aquatic and terrestrial weeds and undesirable plant species. Thus, in their use as an aquatic herbicide, controls of plant species such as Anacharis, *Cabomba caroliniana*, *Lysimastrum nummularia* and *Salvinia rotundifolia* are obtained. In representative operations of their use as aquatic herbicides, good controls of the aquatic weed, *Salvinia rotundifolia*, were obtained when, in separate operations, the weeds were exposed for 24 hours in a tank containing 100 parts by weight of 1-(4-methoxyphenyl)-2-propynyl methylcarbamate and 1-(2-chlorophenyl)-2-propynyl methylcarbamate in one million parts of aqueous medium. As a terrestrial herbicide, the compounds of the present invention are useful for the control of such species as Japanese millet, radish, wild oat, rape and canary grass. In determinations for the control of terrestrial herbicides, the phenylpropynyl methylcarbamates of the above examples were individually dispersed in aqueous media to prepare a series of compositions containing one of the phenylpropynyl methylcarbamates. In separate operations, these aqueous dispersions were applied at a dosage of 50 pounds per acre of soil planted with Japanese millet. It was found that substantially complete controls of the undesirable Japanese millet were obtained.

The products of the present invention are also useful as parasiticides for the control of such undesirable species as Mexican bean beetle, Southern armyworm, fungi, ticks, cockroach and nematodes. They are further useful as systemic insecticides and as anthelmintic agents. As plant fungicides, substantially complete controls of wheat rust disease were obtained when wheat plants susceptible to wheat rust disease caused by rust fungi (*Puccinia graminis-tritici*) were sprayed with an aqueous dispersion containing 0.25 percent by weight of 1-(2-chlorophenyl)-2-propynyl methylcarbamate.

The acetylenic alcohol reactants employed in preparing the products of the present invention may be prepared by adding dropwise an appropriate aldehyde having the formula

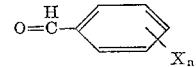

into a solution of sodium acetylide in liquid ammonia, allowing the reaction mixture to stand for about one to four hours, evaporating the ammonia, adding ammonium chloride to remove sodium salts and thereafter recovering the acetylenic alcohol by conventional prodecures.

I claim:
1. 1-(2-chlorophenyl)-2-propynyl methylcarbamate.
2. 1-(4-chlorophenyl)-2-propynyl methylcarbamate.

References Cited in the file of this patent
UNITED STATES PATENTS

| | | |
|---|---|---|
| 2,788,268 | Tursich | Apr. 9, 1957 |
| 2,798,885 | Ensslin et al. | July 9, 1957 |
| 2,844,590 | Cameron | July 22, 1958 |